US005357067A

United States Patent [19]

Keck

[11] Patent Number: 5,357,067

[45] Date of Patent: Oct. 18, 1994

[54] CAM ARRANGEMENT FOR USE IN ROTARY POSITION INDICATORS

[75] Inventor: David W. Keck, Michigan City, Ind.

[73] Assignee: Dwyer Instruments, Inc., Michigan City, Ind.

[21] Appl. No.: 63,493

[22] Filed: May 18, 1993

[51] Int. Cl.[5] ...................... F16H 53/04; H01H 19/62

[52] U.S. Cl. ............................... 200/30 A; 74/568 R; 200/31 R

[58] Field of Search .................. 200/11 R, 11 G, 6 R, 200/6 B, 6 BB, 6 BA, 21, 22, 24, 25, 27 R, 28, 29, 30 R, 30 A, 31 R; 74/567, 568 R, 568 FS, 568 M, 568 T, 569

[56] References Cited

U.S. PATENT DOCUMENTS

| | | | |
|---|---|---|---|
| 3,678,780 | 7/1972 | Ponting | 74/568 R |
| 4,214,133 | 7/1980 | Wolford et al. | 200/31 R |
| 4,774,852 | 10/1988 | Matt | 74/567 |
| 4,885,437 | 12/1989 | Tenniswood et al. | 200/31 R |

OTHER PUBLICATIONS

Copy/Brochure/StoneL, Fergus Falls, MN, pp. 2/3, Valve positioned sensor to minimize install/operational costs (no date).

Copy/Brochure/Westlock, Saddle Brook, N.J., discloses several forms of valve position monitors 1988.

Copy/Brochure/Automax, Cincinnati, OH, "Centura CPL Series Electric Rotary Actuators", pp. 2/4 Aug. 1992.

*Primary Examiner*—A. D. Pellinen
*Assistant Examiner*—Michael A. Friedhofer
*Attorney, Agent, or Firm*—John M. Mann

[57] ABSTRACT

A rotary position indicator for use with devices such as valves, electrical switches, and non-contact reed and proximity switches, which rotary position indicator includes a shaft rotatable about its longitudinal axis and includes a single plane adjustable cam bearing an external profile at its margin that is shaped to provide a camming portion for predetermined dwell and a camming portion for actuator of the device controlled thereby, which provides the option of adjusting the position of the cam relative to the shaft by the user manually shifting the cam in its plane to effect release of the cam relative to the shaft for rotation relative to the shaft to its new working position, with automatic releasable locking of said cam in its new working position then being effected.

8 Claims, 1 Drawing Sheet

CAM ARRANGEMENT FOR USE IN ROTARY POSITION INDICATORS

BACKGROUND OF THE INVENTION

The present invention relates to rotary position indicators, and more particularly, to a cam arrangement for the familiar rotary position indicator for devices such as valves, switches (both sealed and unsealed) and the like, wherein the rotary position indicator includes a shaft rotatable about its longitudinal axis.

Rotary position indicators are employed to indicate the angular status of a valve or other device that operates on a rotary basis. The output of the rotary position indicator employed may be visual or electrical, depending on the arrangement involved.

As to rotary position indicators having an electrical output, in one embodiment the output is concerned with the opening or closing of a switch contact of a switching arrangement for the opening and closing of the switch as a matter of control of the basic operation involved, with the switch either being of the snap action type or of the reed type typically being employed. In this type of arrangement, the shaft of a rotary position indicator is at least kinematically linked to the shaft of the valve or other rotary mechanism that is involved. Thus, when the shaft of the valve or other such rotary mechanism involved rotates, the shaft of the rotary position indicator rotates. Typically, a camming device is fixed to the rotary position indicator's shaft, and thus rotates when the shaft of the valve or other mechanism involved provides its timing function; the camming device in turn actuates a snap action switch by direct mechanical contact, or a reed switch by magnetic coupling.

Another form of electrical output has to do with the actuation of what is known in the art as a "proximity" switch, which is actuated in a manner similar to a reed switch. The formentioned coupling is achieved by a metallic slug or screw that is secured to the camming device involved. The end result causes the "proximity" switch to open or close during the cycle of operation involved.

The arrangement of the shaft for rotary position indicators normally is of two basic types.

One type is the so called "thru-shaft" type, wherein a solid shaft passes from the enclosure exterior through the enclosure wall and transfers the rotary motion of the device involved in the control system to any switches that are involved. Alternately, a magnetic coupling arrangement is involved, in which a magnet is mounted on the end of the two rotary shafts involved, with such magnets being positioned on each side of the enclosure wall. When the shaft that is exterior of the enclosure wall is rotated, the shaft that is interior of the enclosure wall rotates in a similar manner due to the magnetic coupling involved. The magnetic coupling approach has the advantage of permitting continuous enclosure walls in damp or otherwise hazardous locations.

The general arrangement of this invention is concerned with an adjustable cam arrangement which is adjustable in a single plane, and which allows the user to adjust the cam position relative to the rotary position indicator shaft manually and without the use of tools; thus, it is particularly suitable for "in-field" use.

It has long been known that the cam employed in connection with rotary position indicators must be adjustable so that the components that are involved can be actuated or deactuated at selected degrees over the rotational movement that the rotary position indicator is to have.

Basically, several types of this device are available, as follows:

One such device is that comparable to what is disclosed in U.S. Pat. No. 4,214,133, granted Jul. 22, 1980, which involves a disclosure of several forms of rotary position indicators, with the rotary position indicator involved using a simple collar, which is locked onto the position indicator rotary shaft with a set screw; a second screw is separately inserted into the collar and positioned to actuate a snap action or proximity switch when the shaft is rotated.

Another arrangement employs a 360 degree (360°) spline that is mounted on the rotary position indicator shaft and is locked or keyed into position with a so-called "through" or keying pin. The cam employed in such devices has an offset contoured recess which is intended to mate with said spline, with a shoulder limiting the motion of the cam along the spline; a coil spring supplies the resilient force that seats the cam firmly against the spline. In devices of this type, the actuation point is adjusted by lifting or pressing the cam against the spring until it clears the spline, and then rotating the spline to the desired position and releasing same. This style of rotary position device involves cams that must be supplied in pairs because a second cam assembly must hold the spring in operating position.

A major principal object of the invention is to provide a cam arrangement for the rotary position indicator shaft itself that may be manually operated without tools.

Another object of the invention is to provide a cam arrangement for rotary position indicators that operates to effect adjustment of the control system involved by merely shifting the rotary position indicators shaft cam in a single plane between locking and unlocking relation.

Another major object of the invention is to provide the option of adjusting the position of the rotary position indicator device control cam that is part of the installation, or where or when as needed insofar as "in-field" use is concerned.

Other objects, uses, and advantages will be obvious or become apparent from a consideration of the following detailed description and the application drawings in which like reference numerals indicate like pans throughout the several views.

IN THE DRAWINGS

Figure 1:
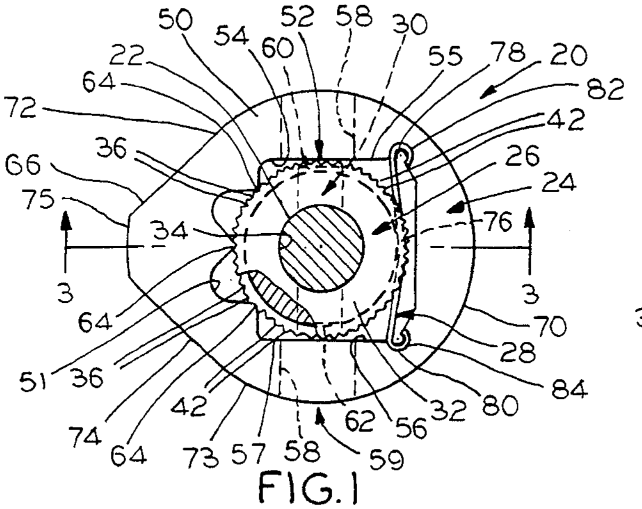
FIG. 1 is a plan view illustrating a preferred embodiment of the invention, taken in association with the usual rotary position indicator shaft, with such shaft being shown in section and the device spline being shown partially in section to better illustrate its external rim surfacing toothed configuration, that in the illustrated embodiment, is 360 degrees (360°) thereabout.

However, the invention is susceptible of modifications and variations that will be obvious to those skilled in the art, and that are intended to be covered by the appended claims.

DESCRIPTION OF THE PREFERRED EMBODIMENT

Reference numeral 20 indicates a preferred embodiment of an adjustable cam assembly that is to, for example, replace the conventional collar cam of a so-called "thru" shaft 22 (that is shown in section in the drawing) or replace the conventional collar cam (not shown) of a magnetic coupling type rotary position indicator (one form of which is illustrated in said U.S. Pat. No. 4,214,133, the entire disclosure of which is incorporated herein by this reference).

Figure 2:
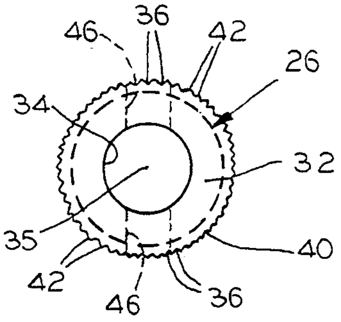
FIG. 2 is a plan view of the spline shown in the embodiment of FIG. 1.
Figure 3:
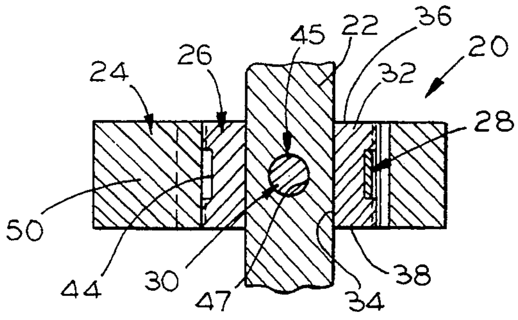
FIG. 3 is a transverse sectional view of the embodiment of FIGS. 1 and 2, taken substantially along the line 3—3 of FIG. 1.
Figure 4:
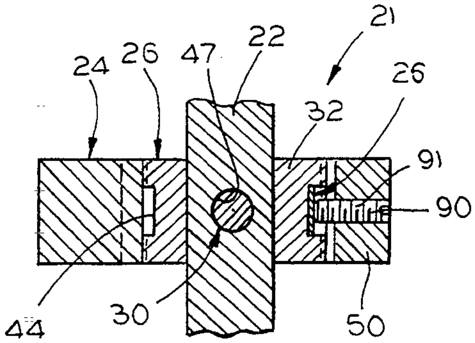
FIG. 4 is similar to the showing of FIG. 3 but illustrates an embodiment of the invention that permits the device illustrated to be locked in its operating position by a set screw arrangement.

The cam assembly 20 in one embodiment that is shown in complete form in the showing of FIGS. 1 through 3, and in modified form 21 in FIG. 4, includes as its four major components a cam member or element 24, a spline element or member 26, a spring member or element 28, and the pin element or member 30. As has been suggested, the basic arrangement of the embodiments of the assembly 20 that are illustrated is such that the device acts in one plane when manually actuated by the installer or user in the manner hereinafter disclosed. As will be observed from the showing of FIGS. 1 through 4, the indicated components of the assembly embodiments herein illustrated are in coplanar relation and act in coplanar relation, thus may be called "single plane adjustable cam assemblies".

The spline member or element 26 is a washer like body 32 having a centrally disposed bore 34 that is proportioned to received the indicated rotary position indicator shaft 22 in slip-fit relation thereto. Spline body 32 further defines opposite end portions 36 and 38 that are also of annular, essentially planar, configuration, and an external rim surfacing 40 that is in substantially co-axial relation with said body bore 34 and its central axis 35 and that is toothod as at 42 circumferentially of said body 34 to provide indentations 36 in said body rim surfacing 40 that are identical and are in equal closely spaced relation about the circumference of the spline body 32.

Further, in accordance with the illustrated embodiment 20 of the invention, the spline body 34 is formed intermediate its end portions 36 and 38, and at its rim surfacing 40, with a groove or indentation 44; the groove or indentation 44 in its preferred form extends 360 degrees (360°) about the spline body 32. The spline body 32 is also formed with a cross hole 45 defined by aperturing 46 on either side of its bore 34 (for the purpose of keying the spline body to rotary position indicator shaft 22, with the shaft 22 being suitably formed with a similar cross hole 47 for this keying purpose).

The cam member or element 24 comprises a body 50 that may have a thickness that approximates the corresponding thickness of the spline body 32, but has an internal profile 51 that provides a special aperturing 52 that is proportioned to loosely receive the spline body 32 in coplanar relation to such cam member or element 24 for movement of the cam member or element 24 in the plane of the spline body 50 and in opposite directions; aperturing 52 also includes opposed rectilinear portions 54 and 56 (formed by portions 55 and 57 of the profile 51) that are oppositely disposed and are spaced in the plane of the cam body 52, when the cam body 50 is applied to shaft 52 in coplanar relation to spline body 32, to act to cam the cam body 50 back and forth in said directions.

Cam body 50 is also formed with a cross hole 59 defined by aperturing 58 on either side of the aperturing 52; the apertures 58 are to have an internal diameter that exceeds that of the spline body cross hole 45 (see FIG. 1 ) for reasons that will be made clear hereinafter.

The keying pin 30 is proportioned in external diameter to be slip-fit received through both spline body cross hole 45 and the shaft cross hole 47 (for the purpose of keying spline 26 to shaft 22); in accordance with the present invention, the pin 30 is proportioned lengthwise thereof to be wholly disposed within spline body 32 when applied to shaft 22 in centered relation in said keying relationship, so that the pin ends 60 and 62 do not interfere with the said adjustment movement that pursuant to the instant invention is made available in a single plane for cam member or element 24 and in coplanar relation thereto.

The spring 28 that is illustrated is of the leaf spring type, and is employed to bias the cam body 50 so that in normal operation it acts to be "keyed" with respect to the spline 26, with, in the illustrated embodiments, cam body 50 also being formed so that its aperturing 52 defines several locking projections or teeth 64 that are positioned to respectively seat in locking relation with the indentations 36 of spline 26, with which such projections or teeth 64 have been aligned with in adjusting the cam member or element 24 relative to the spline 26 in accordance with the present invention.

The cam body 50 defines a marginally or externally located external profile 66 that may be shaped in any desired manner to provide predetermined dwell and actuation of the device that is to be controlled thereby on rotation of the rotary position indicator shaft 22, in accordance with the usual manner of operation rotary position indicators of this type, to which assembly 20 or its equivalent is applied.

In the embodiments illustrated in the drawings for purposes of illustrating the invention, the marginally located external profile 66 of the cam body 50 comprises a circular contour portion 70 of approximately 180 degrees (180°) in length about the cam body 50 that forms a dwell portion of the cam member or element 24; at the ends of the cam body circular contour portions 70 (approximately indicated by the respective reference terminals 72 and 73), such portion 70 merges smoothly into a frustoconical conical portion 74 that is shaped to define a tip 75 that forms the actuation portion of the cam body external, marginally located, profile 66.

Spring 28 in the embodiments illustrated is applied between the cam body 50 and the spline body 32 in alignment with the spline body groove 44, with spring 28 being shaped so that its mid portion 76 resiliently engages the cam body 50 within the groove 44 of the later. and the spring device 28 at its ends 78 and 80 being semi-circularly formed for seating of the spring ends 78 and 80 against cam body 50 at cam body grooves 82 and 84, whereby the cam body teeth 64 are resiliently biased against the cooperating teeth 42 of the spline body 26.

The assembly 20 and its equivalents shown in FIGS. 4 through 12 thus provides for manual adjustment of the position of the cam body 50 relative to the spline body 32, by the assembler making it possible, as needed, to have access to the rotary position indicator shaft 22, and then manually urging the cam body 50 in the radial direction of its tip to sufficiently overcome the resilient bias of spring 28 and then turning the said cam body 50 relative to the centerline 23 of shaft 22, as needed to reposition the cam body 50 relative to spline body 32, to effect the change of performance of the rotary position indicator as desired, after which cam body 50 is released for automatic keying with the spline bodies 32, and the rotary. position indicator will provide the changed performance timing that is then desired.

In the embodiment 21 of FIG. 4, a set screw 90 (which is threaded into internally threading aperture of cam body 50) is applied to the spline body 32 to set same relative to cam body 50, and when the assembly 21 has been adjusted as needed (in accordance with the invention as already described) the said set screw 90 is set against the spline body 32, within its groove 44, by turning said set screw 90, as by using a conventional screwdriver or the like for said purpose, to lock the cam body 50 in such adjusted position relative to the spline body 32 (and thus shaft 22). In the showing of FIG. 4, the set screw 90 is applied against the portion of the leaf spring 38 that engages the spline body 32 within the said spline body groove 24, and, of course, this may be done when any "in-field" adjustment is made of device 21.

As to the specifics of the resilient biasing action that the cam member or element 24 has relative to spline member or element 26, this may be effected in any suitable manner, such as by way of using a helical spring seated in a suitable aperture of the cam body 50 and proportioned to bear against the spline body 32 within its indicated groove 44 or other suitable recess. As to the said spline body groove 44, it will be apparent that it need not be in 360 degree (360 °) relation to the spline body 32, but may be of sufficient length about the periphery of the spline body 32 to cover the range of adjustment permitted by the particular assembly 20 or its equivalent.

Figure 5:
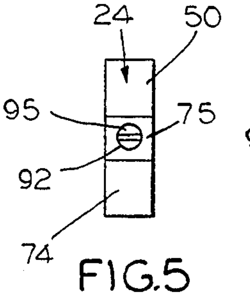
FIG. 5 is an end view of the cam member of the adjustment device embodiment shown in FIG. 1, illustrating same equipped as a target for the well known "proximity" switch.
Figure 6:
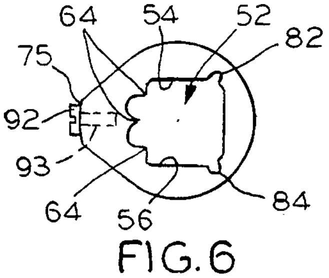
FIG. 6 is a plan view of the cam member combination shown in FIG. 5.

Referring now to the various modified forms of the cam body 50 that are shown in FIGS. 5–12 (any of which may be used to complete assemblies 20 and 21), in the showing of FIGS. 5 and 6, a screw 92 is threadedly applied to cam body 50, within a suitably internally threaded aperture 93 formed therein, and at the tip 75 of the cam body contour portion 74, to serve as a cam body target for a proximity switch. It is to be noted in this connection that the screw 92 defines a head portion 95 (see FIG. 5) that is disposed in target forming position, with the screw 92 itself being centered relative to the portion 74 of the cam body 50.

Figure 7:
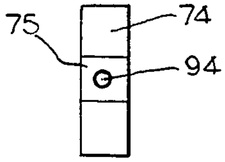
FIG. 7 is a view similar to FIG. 5, showing an arrangement of said cam member in which the tip contour of said member receives a metallic element or slug for use as the target for proximity switches.
Figure 8:
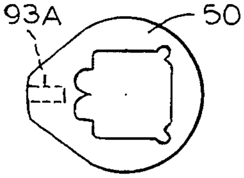
FIG. 8 is a plan view of the cam member combination shown in FIG. 7, with the metallic element or slug being shown in outline.

In the showing of FIGS. 7 and 8, instead of the screw 92, the aperture 93A for same may be proportioned to force fit receive a metallic slug or rod element 94 that serves as the target for a proximity type switch.

Figure 9:
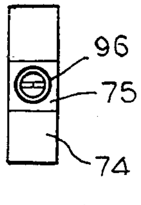
FIG. 9 is a view similar to that of FIG. 5, but shows the cam member equipped with a magnet of ring type configuration (that is held down with a screw), with such magnets being employed to actuate a magnetic or reed switch.
Figure 10:
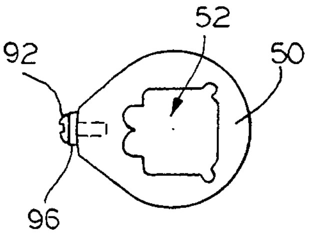
FIG. 10 is a plan view of the cam member combination shown in FIG. 9.

In the showing of FIGS. 9 and 10, the screw 92 has applied to its aperture 93 to hold small ring shaped magnet 96 against the tip of the cam body 50 for using the resulting assembly to actuate a magnetic or reed switch.

Figure 11:
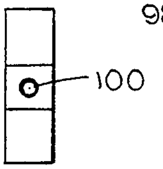
FIG. 11 is a view similar to that of FIG. 5, but showing the cam member tip receiving a small rod type magnet that is used to actuate magnetic or reed switches.
Figure 12:
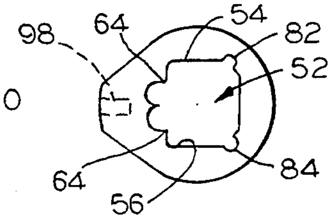
FIG. 12 is a plan view of the cam member combination, shown in FIG. 11.

In the showing of FIG. 11 and 12, the cam body is formed with an aperture 98 that is similar to that formed in the cam body 50 of the showing of FIGS. 7 and 8, with such aperture 98 force fit receiving a suitably proportioned rod type magnet 100, whereby the assembly resulting may be used to actuate magnetic or reed switches.

The foregoing description and the drawing FIGURES hereof are given merely to explain and illustrate the invention, and the invention is not to be limited thereto, except insofar as the appended claims are so limited, since those skilled in the art who have this disclosure before them will be able to make modifications and variations therein, without departing from the scope of the invention.

What is claimed is:

1. In a rotary position indicator, for devices such as valves and switches, of the type that includes a shaft rotatable its longitudinal axis, a cam arrangement therefor comprising:

a spline of annular configuration including a centrally disposed bore proportioned to receive the shaft in slip-fit relation thereto and oppositely disposed end portions of annular configuration between which there is disposed an external rim surfacing for said spline that is in substantially coaxial relation to said spline bore, with said spline rim surfacing being toothed circumferentially of said spline to provide indentations in said spline rim surfacing that are in equal, closely spaced, relation, circumferentially of said spline rim surfacing, about said spline bore, and with said spline rim surfacing having a groove circumferentially thereof, means for keying said spline to the shaft for rotatable movement therewith, a generally annular cam received over said spline in substantial coplanar relation thereto, said cam comprising:

an internal profile that provides aperturing for said cam proportioned for loosely receiving said spline for coplanar back and forth motion with respect thereto in opposite directions and that defines internally cam tooth means for meshing with certain of said spline indentations on one side of said spline, and an external profile shaped to provide a camming portion for predetermined dwell and a camming portion for actuation of the device controlled thereby on rotation of the shaft, and resilient means interposed between said spline groove and said cam for biasing said cam to selectively present said cam tooth means into said meshing relation with said spline indentations, whereby, said cam arrangement provides the in-field option of adjusting the position of said cam rotationally of said spline to change the rotary position indication of same by manually shifting said cam against the action of said resilient means to separate said tooth means from said spline indentations, and then manually rotating said cam relative to said spline to said changed position, whereupon on release of said cam relative to said spline, said cam tooth means thereof meshes with those of said spline indentations that provide the adjusted position of said cam relative to said spline.

2. The cam arrangement set forth in claim 1, wherein: the external profile of said cam comprises a circular contour of approximately 180 degrees (180°) that forms said dwell portion thereof, which smoothly merges into a frustoconical contour that forms said actuation portion thereof.

3. The cam arrangement set forth in claim 2, wherein: said contour at its area of maximum projection externally of said cam is apertured in parallel to said directions for anchoring therein means for actuating said devices.

4. The cam arrangement set forth in claim 1, wherein: said resilient means comprises a leaf spring seated in and beating against said spline groove, with the ends of said leaf spring being anchored in said cam in spaced apart relation.

5. The cam arrangement set forth in claim 2, wherein: said groove of said spline extends 360 degrees (360°) thereabout.

6. The cam arrangement set forth in claim 1, wherein: said cam tooth means is integral with said cam.

7. The cam arrangement set forth in claim 1, wherein: said means for keying said spline to the shaft comprises a pin that is longitudinally dimensioned to be substantially centered within said spline, whereby said cam may be adjusted over rotational angulation of 360 degrees (360°).

8. The cam arrangement set forth in claim 1, including:

locking set screw means for affixing said cam relative to said spline in a desired position of adjustment.

* * * * *